(12) United States Patent
Kheirandish et al.

(10) Patent No.: US 9,074,085 B2
(45) Date of Patent: Jul. 7, 2015

(54) HETEROPHASIC POLYPROPYLENE WITH HIGH FLOWABILITY AND ENHANCED MECHANICAL PROPERTIES

(75) Inventors: Saeid Kheirandish, Neuss (DE); Petar Doshev, Linz (AT); Claudia Kniesel, Linz (AT)

(73) Assignee: Borealis AG, Vienna (AT)

( * ) Notice: Subject to any disclaimer, the term of this patent is extended or adjusted under 35 U.S.C. 154(b) by 53 days.

(21) Appl. No.: 13/817,249

(22) PCT Filed: Aug. 10, 2011

(86) PCT No.: PCT/EP2011/004011
§ 371 (c)(1),
(2), (4) Date: Mar. 26, 2013

(87) PCT Pub. No.: WO2012/028252
PCT Pub. Date: Mar. 8, 2012

(65) Prior Publication Data
US 2013/0197153 A1    Aug. 1, 2013

(30) Foreign Application Priority Data
Aug. 30, 2010    (EP) ................................ 10009009

(51) Int. Cl.
| | |
|---|---|
| C08L 23/10 | (2006.01) |
| C08L 23/16 | (2006.01) |
| C08L 23/12 | (2006.01) |
| C08F 10/00 | (2006.01) |
| C08F 10/06 | (2006.01) |
| C08F 297/08 | (2006.01) |
| C08L 23/14 | (2006.01) |
| C08F 110/06 | (2006.01) |
| C08F 210/06 | (2006.01) |

(52) U.S. Cl.
CPC ................ *C08L 23/12* (2013.01); *C08F 10/00* (2013.01); *C08F 10/06* (2013.01); *C08F 110/06* (2013.01); *C08F 210/06* (2013.01); *C08F 297/083* (2013.01); *C08L 23/10* (2013.01); *C08L 23/14* (2013.01); *C08L 23/16* (2013.01); *C08L 2205/02* (2013.01); *C08L 2205/025* (2013.01); *C08L 2205/03* (2013.01); *C08L 2308/00* (2013.01); *C08L 2314/06* (2013.01)

(58) Field of Classification Search
CPC ......... C08L 23/10; C08L 23/12; C08L 23/14; C08L 23/16; C08L 2205/02; C08L 2205/025; C08L 2208/025; C08L 2308/00; C08L 2314/06; C08F 10/06; C08F 110/06; C08F 210/06
USPC .................... 525/191, 240; 524/528
See application file for complete search history.

(56) References Cited

U.S. PATENT DOCUMENTS 6,342,566 B2 * 1/2002 Burkhardt et al. ............ 525/191

FOREIGN PATENT DOCUMENTS

| EP | 0 887 379 | 12/2004 |
|---|---|---|
| EP | 1 935 938 | 6/2008 |
| EP | 2 072 546 | 6/2009 |
| EP | 2 075 284 | 7/2009 |
| EP | 2 182 030 | 4/2012 |
| WO | WO 92/12182 | 7/1992 |
| WO | WO 99/24479 | 5/1999 |
| WO | WO 01/48034 | 7/2001 |
| WO | WO 01/58970 | 8/2001 |
| WO | WO 03/051934 | 6/2003 |
| WO | WO 2005/104940 | 11/2005 |
| WO | WO 2005/113672 | 12/2005 |
| WO | WO 2009077032 A1 * | 6/2009 |
| WO | WO 2009077034 A1 * | 6/2009 |

OTHER PUBLICATIONS

International Search Report mailed Sep. 7, 2011 for International Application No. PCT/EP2011/004011.
Written Opinion mailed Sep. 7, 2011 for International Application No. PCT/EP2011/004011.
Randall, James C., *A Review of High Resolution Liquid $^{13}$Carbon Nuclear Magnetic Resonance Characterizations of Ethylene-Based Polymers*, J. Macromol. Chem. Phys., C29(2 & 3), pp. 201-317, 1989.
Singh, Gurmeet et al., *Analysis Method; Triad sequence determination of ethylene-propylene copolymers—application of quantitative $^{13}$C NMR*, Elsevier, Polymer Testing 28, pp. 475-479, 2009.
Busico, Vincenzo et al., *Alk-1-ene Polymerization in the Presence of a Monocyclopentadienyl Zirconium(IV) Acetamidinate Catalyst: Microstructural and Mechanistic Insights$^a$*, Macromolecular Journals, Macromolecular Rapid Communications, 28, pp. 1128-1134, 2007.
Zhou, Zhe et al., *A new decoupling method for accurate quantification of polyethylene copolymer composition and triad sequence distribution with $^{13}$C NMR*, Elsevier, Journal of Magnetic Resonance 187, pp. 225-233, 2007.
Busico, Vincento et al., *Microstructure of polypropylene*, Elsevier, Prog. Polym. Sci. 26, pp. 443-533, 2001.
Resconi, Luigi et al., *Selectivity in Propene Polymerization with Metallocene Catalysts*, Chemical Reviews, vol. 100, No. 4, pp. 1253-1345, 2000.

(Continued)

*Primary Examiner* — Irina S Zemel
*Assistant Examiner* — Jeffrey Lenihan
(74) *Attorney, Agent, or Firm* — Fay Sharpe LLP (57) ABSTRACT

The present invention relates to a heterophasic polypropylene resin comprising a crystalline propylene homopolymer matrix (A) and an amorphous propylene copolymer phase (B) dispersed within the matrix having excellent mechanical properties, in particular at low temperatures, and at the same time high flowability. Further, the invention relates to a production process of the heterophasic polypropylene resin, the use of such a resin in a polypropylene composition and to articles made of the heterophasic polypropylene resin.

14 Claims, 1 Drawing Sheet

(56) References Cited

OTHER PUBLICATIONS

Wang, Wen-Jun et al., *Structural Analysis of Ethylene/Prolylene Copolymers Synthesized with a Constrained Geometry Catalyst*, Macromolecules 2000, 33, pp. 1157-1162, 2000.

Busico, Vincenzo et al., *Full Assignment of the $^{13}C$ NMR Spectra of Regioregular Polypropylenes: Methyl and Methylene Region*, Macromolecules 1997, 30, pp. 6251-6263, 1997.

Cheng, H.N., *$^{13}C$ NMR Analysis of Ethylene-Propylene Rubbers*, Macromolecules 1984, 17, pp. 1950-1955, 1984.

Kakugo, Masahiro et al., *$^{13}C$ NMR Determination of Monomer Sequence Distribution in Ethylene-Propylene Copolymers Prepared with $\delta$-$TiCl_3$—$Al(C_2H_5)_2Cl$*, Macromolecules 1982, 15, pp. 1150-1152, 1982.

\* cited by examiner

HETEROPHASIC POLYPROPYLENE WITH HIGH FLOWABILITY AND ENHANCED MECHANICAL PROPERTIES

The present invention relates to a heterophasic polypropylene resin comprising a crystalline propylene homopolymer matrix (A) and an amorphous propylene copolymer phase (B) dispersed within the matrix having excellent mechanical properties, in particular at low temperatures, and at the same time high flowability. Further, the invention relates to a production process of the heterophasic polypropylene resin, the use of such a resin in a polypropylene composition and to articles made of the heterophasic polypropylene resin.

In recent years the demand for high performance propylene-based plastics with enhanced mechanical properties and processability has grown, mainly due to the trend in various industrial fields (e.g. automobile or household industries) that metal parts are replaced with plastics.

Isotactic polypropylene offers the potential features of one such material, and can be compounded with different elastomeric polymers to provide an ideal balance of flexibility and toughness. A well known approach for improving the toughness of an isotactic polypropylene is the incorporation of ethylene-propylene copolymer as dispersed phase into the polypropylene matrix. The simplest way of providing a heterophasic product is post-reactor compounding. However, this results in relatively high compounding costs, undesired changes in matrix and rubber properties during the compounding process and partially inhomogeneous mixing of the matrix and the rubber phase. In-reactor production of such materials can both reduce production cost and improve homogeneity of the phase structure, resulting in higher toughness at identical elastomer content. For achieving high homogeneity, a high matrix viscosity is required, limiting the flowability of the resulting materials.

In usual applications, high flowability of the heterophasic material is desired.

WO 2005/113672 discloses heterophasic polyolefin composition produced in the presence of a Ziegler-Natta catalyst having a bimodal rubber content of 20 to 45 wt %, a melt flow rate in the range of 10 to 15 g/10 min and a flexural modulus in the range of 800 to 1100 MPa.

WO 01/58970 relates to propylene impact copolymer compositions comprising a low amount of amorphous polypropylene copolymer.

WO 05/104940 discloses a high flow composition of propylene homo- and ethylene copolymers wherein the fraction soluble in p-xylene at 25° C. (XCS) is used in an amount not greater than 15.0 wt %.

EP 2072546 A1 relates to a heterophasic polypropylene with good impact properties wherein the heterophasic polypropylene preferably comprises a fraction soluble in p-xylene at 25° C. (XCS) in an amount of 15 to 22 wt %.

EP 2075284 A1 relates to a heterophasic polypropylene resin having an MFR (2.16 kg, 230° C.) of more than 100 g/10 min. The composition shows a high flowability and good impact properties at low temperatures.

High flow heterophasic materials are specifically desired in the automotive field. It is particularly desired to replace automotive parts which may be subjected to extremely low temperatures such as −30 or −40° C. still being made from metal alloys by lighter plastics.

Generally speaking, flowability of the heterophasic polypropylene resin can be increased by increasing the melt flow rate of the matrix phase. However, there are certain limitations. A too low viscosity of the matrix relative to the viscosity of the rubber will result in coarse morphology and in turn in poor impact performance especially at low temperatures.

Thus, there is still the need for materials having an even better balance of flowability and low temperature impact properties which can be easily injection moulded.

The present invention is based on the findings that the above object can be achieved by a heterophasic polypropylene resin comprising a crystalline polypropylene homopolymer matrix (A) and an amorphous propylene/ethylene or propylene/alpha olefin copolymer phase (B) dispersed within the matrix, wherein the heterophasic polypropylene resin has a melt flow rate $MFR_2$, according to ISO 1133 at 230° C./2.16 kg of 25 to below 100 g/10 min and a fraction insoluble in p-xylene at 25° C. (XCU) with an intrinsic viscosity of less than 1.1 dl/g, determined according to DIN EN ISO 1628-1 and -3, and a melting point of more than 150° C., and a fraction soluble in p-xylene at 25° C. (XCS) having an ethylene and/or alpha olefin content of 40 to 70 wt % and showing no melting point in an DSC analysis in the range between 0 and 300° C.

The resulting heterophasic propylene resin has improved impact properties, in particular at low temperatures and at the same time high flowability.

Hence, the present invention provides a heterophasic polypropylene resin having an $MFR_2$ according to ISO1133 at 230°/216 kg of 25 to below 100 g/10 min comprising a crystalline polypropylene homopolymer matrix (A) and an amorphous propylene/ethylene or propylene/alpha olefin copolymer phase (B) dispersed within the matrix, wherein the heterophasic polypropylene resin has 35 to 75 wt % of a fraction insoluble in p-xylene at 25° C. (XCU) with
  an intrinsic viscosity of less than 1.1 dl/g, determined according to DIN EN ISO 1628-1 and -3, and
  a melting point of more than 150° C., and 25 to 65 wt % of a fraction soluble in p-xylene at 25° C. (XCS) with
  an intrinsic viscosity of 2.0 to 5.0 dl/g, determined according to DIN EN ISO 1628-1 and -3,
  content of ethylene and/or alpha olefin in the range of 40 to 70 wt %, based on the total weight of XCS fraction, and
  showing no melting point in a DSC analysis in the range between 0 and 300° C.

The term "polypropylene" denotes a propylene homo- or copolymer or a mixture of such propylene homo- or copolymers.

The term "showing no melting point" indicates that the fraction is essentially fully amorphous.

The fraction insoluble in p-xylene (XCU) preferably consists of a crystalline propylene homopolymer and shows a crystallinity of at least 50%, more preferably of at least 55% with respect to analysis by wide-angle X-ray diffraction.

The fraction soluble in p-xylene (XCS) preferably consists of a propylene/ethylene or propylene/alpha olefin copolymer which is largely amorphous, i.e. the crystallinity of the phase is less than 5%, preferably less than 3% with respect to analysis by wide-angle X-ray diffraction. It is particularly preferred that the XCS fraction does not exhibit α-, β- or γ-crystalline PP fractions when analyzed by wide-angle X-ray diffraction. It is further preferred that the heterophasic polypropylene does not show a melting point attributed to crystalline polyethylene in DSC below 145° C.

It is preferred that the alpha olefins used in the dispersed phase (B) are selected from the group of $C_4$ to $C_{12}$ alpha-olefins which may be linear or branched.

Moreover, it is preferred that the dispersed phase (B) consists of a propylene-ethylene rubber copolymer.

In a preferred embodiment, the resin consists of the matrix phase (A) and the dispersed phase (B).

The fraction insoluble in p-xylene at 25° C. (XCU) is meant to be the fraction of the polypropylene resin that is not soluble in p-xylene at 25° C. representing for the most part isotactic propylene homo- or copolymer.

The fraction soluble in p-xylene (XCS) is denoted the fraction of the polypropylene resin that is soluble in p-xylene at 25° C. representing for the most part amorphous ethylene-propylene copolymer.

The XCU fraction of the present invention has an amount of propylene monomer units of at least 97 mol %, more preferably at least 99 mol %.

The amount of propylene monomer units in the XCU fraction is preferably determined by NMR measurement.

Preferably, the XCU fraction shows a content of 2.1 regio-inversions of above 0.1 mol-% when measured by means of $^{13}$C-NMR according to the methodology described in the examples.

Furthermore, the XCU fraction is present in amount of 35 to 75 wt %, preferably of 37 to 73 wt %, more preferably of 40 to 71 wt %, even more preferably of 42 to 70 wt %, most preferably of 40 to 60 wt % in the heterophasic polypropylene resin.

The XCU fraction of the present invention has an intrinsic viscosity of less than 1.1 dl/g or less, preferably of 0.2 to 1.1 dl/g, more preferably 0.3 to 1.0 dl/g, determined according to DIN EN ISO 1628-1 and -3.

Moreover, the melting point of the XCU fraction is more than 150° C., preferably more than 153° C. The upper limit for the melting point of the XCU fraction is 175° C.

In addition it is preferred that XCU fraction has a melt flow rate of at least 200 g/10 min, more preferred of least 250 g/10 min, most preferred of at least 300 g/10 min determined according to ISO 1133 at 230° C./2.16 kg. The melt flow rate of the XCU fraction is preferably not higher than 2500 g/10 min determined according to ISO 1133 at 230° C./2.16 kg.

It is further preferred that the XCU fraction has a weight average molecular weight $M_w$ of 40 to 170 kg/mol, more preferably of 50 to 150 kg/mol, still more preferably of 60 to 120 kg/mol, and preferably a molecular weight distribution $M_w/M_n$ (MWD) of 2.5 to 3.5, more preferably of 2.6 to 3.2, most preferably of 2.6 to 3.0.

Furthermore, the XCU fraction has preferably a crystallisation temperature $T_c$ of 110 to 135° C., more preferably of 113 to 130° C., most preferably of 115 to 128° C., as determined by DSC.

According to the present invention the XCS fraction is used in an amount of 25 to 65 wt %, preferably of 27 to 63 wt %, more preferably of 29 to 60 wt %, even more preferably from 30 to 58 wt %, and most preferably from 30 to 40 wt % in the heterophasic polypropylene resin.

The XCS fraction preferably has an intrinsic viscosity of 2.0 to 5.0 dl/g, preferably 2.1 to 4.5 dl/g, more preferably 2.1 to 4.0 dl/g, most preferably 2.1 to 3.5 dl/g, determined according to DIN EN ISO 1628-1 and -3.

Furthermore, the XCS fraction does not show a melting point in a DSC analysis in the range between 0 and 300° C.

The amount of ethylene monomer units in the XCS fraction is 40 to 70 wt %, preferably 42 to 65 wt %, more preferably 43 to 60 wt %, based on the total weight of the XCS fraction.

The amount of propylene monomer units in the XCS fraction is preferably determined by NMR measurement preferably further showing a statistical distribution of at least 50%, more preferably at least 60%, most preferably at least 65% of the ethylene monomer units in the XCS fraction.

It is further preferred that the XCS fraction has a weight average molecular weight $M_w$ of 250 to 900 kg/mol, more preferably 280 to 800 kg/mol, still more preferably 300 to 750 kg/mol determined by GPC according to ISO 16014-1, and 4.

Preferably, the XCS fraction has a molecular weight distribution $M_w/M_n$ (MWD) of 1.0 to 4.0, more preferably of 1.5 to 3.5, most preferably of 2.0 to 3.0.

The heterophasic polypropylene resin according to the present invention preferably has a Charpy notched impact strength at +23° C. of at least 30 kJ/m$^2$, more preferably of at least 35 kJ/m$^2$, still more preferably of at least 45 kJ/m$^2$, and most preferably of at least 50 kJ/m$^2$. The Charpy notched impact strength at +23° C. can be as high as 120 kJ/m$^2$, resulting in partial fracture of the specimen.

Further, the heterophasic polypropylene resin preferably has a Charpy notched impact strength at −20° C. of at least 12.5 kJ/m$^2$, more preferably at least 13 kJ/m$^2$, still more preferably at least 15 kJ/m$^2$. The Charpy notched impact strength at −20° C. will normally not be higher than 70 kJ/m$^2$.

The Charpy notched impact strength at −40° C. of the inventive heterophasic polypropylene resin preferably is of at least 11 kJ/m$^2$, more preferably at least 13 kJ/m$^2$, still more preferably at least 15 kJ/m$^2$, and most preferably at least 17 kJ/m$^2$. The Charpy notched impact strength at −40° C. will normally not be higher than 35 kJ/m$^2$.

The preferred high values for Charpy notched impact strength indicate excellent impact properties of the polypropylene resin at low temperatures.

In addition, the inventive heterophasic polypropylene resin has a high melt flow rate. The melt flow rate mainly depends on the average molecular weight. This is due to the fact that long molecules render the material a lower flow tendency than short molecules. A decrease in molecular weight means an increase in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight.

The heterophasic polypropylene resin according to the invention has a melt flow rate MFR (2.16 kg, 230° C.) of 25 to below 100 g/10 min, preferably of 28 to 95 g/10 min, most preferably 30 to 90 g/10 min, determined according to ISO 1133 thus indicating a high flowability of the polypropylene resin.

Furthermore it is preferred that the heterophasic polypropylene resin has a tensile modulus of at least 600 MPa, more preferably of at least 700 MPa. The tensile modulus will normally not be higher than 2000 MPa.

In addition, it is preferred that the polypropylene resin has a melting temperature $T_m$ of higher than 145° C., more preferably higher than 148° C., most preferably higher than 150° C., as determined by differential scanning calorimetry (DSC). The upper limit for the melting point of the polypropylene resin is 175° C.

In a preferred embodiment the heterophasic polypropylene resin has been produced in a multi-stage process. Multistage processes include also bulk/gas phase reactors known as multizone gas phase reactors.

A preferred multistage process is a "loop-gas phase"-process, such as developed by Borealis A/S, Denmark (known as BORSTAR® technology) described e.g. in patent literature, such as in EP 0 887 379 or in WO 92/12182.

The heterophasic polypropylene resin according to this invention is produced preferably in a multi-stage process in a multi-stage reaction sequence. Thereby it is preferred that the polypropylene homopolymer matrix (A) is produced in the bulk reactor and afterwards transferred to the gas phase reactor in which the propylene/ethylene and/or propylene/alpha olefin copolymer phase (B) is produced in the presence of component (A).

Thus, the process for producing the heterophasic polypropylene resin of the present invention preferably comprises
(i) at least one liquid bulk polypropylene homo-polymerization step carried out at a temperature of 60 to 90° C., preferably of 65° C. and 88° C., most preferably of 65 to 85° C., and
(ii) at least one gas phase propylene/ethylene and/or propylene/alpha olefin copolymerization step carried out at a temperature of 55 to 90° C., preferably of 60° C. to 85° C., more preferably of 65 to 85° C.,
wherein the liquid bulk polypropylene homo-polymerization step (i) is carried out prior to the gas phase copolymerization step (ii), the used catalyst system comprises an asymmetric single-site catalyst and the molar ratio between comonomer and propylene feed is of 0.6 to 2.6, preferably of 0.8 to 2.4, more preferably of 0.8 to 2.3 in the copolymerization step (ii).

The bulk polymerisations are preferably performed in a so-called loop reactor.

Optionally, the process may also comprise a pre-polymerisation step in a manner known in the field and which may precede the first polymerisation step (i).

The process is preferably a continuous process.

It is also preferred that the polymerization reactions in both reactor steps (i) and (ii) are carried out at relative low pressure in order to ensure that the used catalyst has a long life time.

Therefore, it is preferred that in the bulk reactor of step (i) the pressure is within the range of 20 bar to 80 bar, preferably of 25 bar to 60 bar, more preferably of 30 bar to 50 bar.

The pressure of the gas phase reactor of step (ii) is preferably within the range of 5 bar to 50 bar, preferably of 15 bar to 35 bar.

The residence time can vary in both reactor zones. In one embodiment of the process for producing the propylene polymer the residence time in bulk reactor, e.g. loop is in the range 0.5 to 5 hours, e.g. 0.5 to 2 hours Furthermore, it is preferred that in both reactor steps (i) and (ii) hydrogen is added for controlling the molar mass in a manner known per se.

The progress of the polymerization reactions are controlled by their thermal output.

If desired, the polymerization may be effected in a known manner under supercritical conditions in the bulk, preferably loop reactor, and/or as a condensed mode in the gas phase reactor.

In a further embodiment, the components (A) and (B) are preferably polymerized separately and compounded by melt-mixing.

According to the present invention, in order to produce the matrix phase (A) showing a high melt flowability a single site catalyst system (SSC) is used.

It is known that there is a catalyst-specific upper limit of achievable MFR. For example, for catalyst BCF20P (obtainable form Borealis, Finland) respectively Polytrack 8502 (obtainable from Grace, USA) with standard donor under Borstar® process conditions the limit is at approx. 400 g/10 min. In contrast, utilizing single-site catalysts (SSC), which have much better $H_2$-response, it is possible to achieve MFR-values of several thousands.

The catalyst system may further comprise an activator as a cocatalyst, as described in WO 03/051934, which is enclosed herein by reference.

An asymmetric metallocene catalyst according to this invention is a catalyst comprising at least two organic ligands which differ in their chemical structure.

Furthermore it is preferred, that the catalyst system has a surface area of less than 25 $m^2$/g, yet more preferred less than 20 $m^2$/g, still more preferred less than 15 $m^2$/g, yet still less than 10 $m^2$/g and most preferred less than 5 $m^2$/g. The surface area according to this invention is measured according to ISO 9277 ($N_2$).

It is in particular preferred that the catalytic system according to this invention comprises an asymmetric catalyst, i.e. a catalyst as defined below. In a specific embodiment the porosity of the catalyst system is not detectable when applying the method according to DIN 66135 ($N_2$) and has a surface area measured according to ISO 9277 ($N_2$) less than 5 $m^2$/g.

Preferably, the asymmetric catalyst employed comprises an organo-metallic compound of a transition metal of group 3 to 10 or the periodic table (IUPAC) or of an actinide or lanthanide.

The asymmetric catalyst is more preferably of a transition metal compound of formula (I)

$$(L)_m R_n MX_q \quad (I)$$

wherein

M is a transition metal of group 3 to 10 or the periodic table (IUPAC), or of an actinide or lantanide, each X is independently a monovalent anionic ligand, such as σ-ligand, each L is independently an organic ligand which coordinates to M, R is a bridging group linking two ligands L, m is 2 or 3, n is 0 or 1, q is 1, 2 or 3, m+q is equal to the valency of the metal, and with the proviso that at least two ligands "L" are of different chemical structure.

Said asymmetric catalyst is preferably a single site catalyst (SSC).

In a more preferred definition, each "L" is independently
(a) a substituted or unsubstituted cycloalkyldiene, i.e. a cyclopentadiene, or a mono-, bi- or multifused derivative of a cycloalkyldiene, i.e. a cyclopentadiene, which optionally bear further substituents and/or one or more hetero ring atoms from a Group 13 to 16 of the Periodic Table (IUPAC); or
(b) an acyclic, $\eta^1$- to $\eta^4$- or $\eta^6$-ligand composed of atoms from Groups 13 to 16 of the Periodic Table, and in which the open chain ligand may be fused with one or two, preferably two, aromatic or non-aromatic rings and/or bear further substituents; or
(c) a cyclic σ-, $\eta^1$- to $\eta^4$- or $\eta^6$-, mono-, bi- or multidentate ligand composed of unsubstituted or substituted mono-, bi- or multicyclic ring systems selected from aromatic or non-aromatic or partially saturated ring systems and containing carbon ring atoms and optionally one or more heteroatoms selected from Groups 15 and 16 of the Periodic Table.

The term "σ-ligand" is understood in the whole description in a known manner, i.e. a group bonded to the metal at one or more places via a sigma bond. A preferred monovalent anionic ligand is halogen, in particular chlorine (Cl).

In a preferred embodiment, the asymmetric catalyst is preferably of a transition metal compound of formula (I)

$$(L)_m R_n MX_q \quad (I)$$

wherein

M is a transition metal of group 3 to 10 or the periodic table (IUPAC), or of an actinide or lantanide, each X is independently a monovalent anionic ligand, such as σ-ligand, each L is independently an organic ligand which coordinates to M, wherein the organic ligand is an unsaturated organic cyclic ligand, more preferably a substituted or unsubstituted, cycloalkyldiene, i.e. a cyclopentadiene, or a mono-, bi- or multifused derivative of a cycloalkyldiene, i.e. a cyclopentadiene, which optionally bear further substituents and/or one or more hetero ring atoms from a Group 13 to 16 of the Periodic Table (IUPAC), R is a bridging group linking two ligands L, m is 2 or 3, n is 0 or 1, q is 1, 2 or 3, m+q is equal to the valency of the metal, and with the proviso that at least two ligands "L" are of different chemical structure.

According to a preferred embodiment said asymmetric catalyst compound (I) is a group of compounds known as metallocenes. Said metallocenes bear at least one organic ligand, generally 1, 2 or 3, e.g. 1 or 2, which is η-bonded to the metal, e.g. a $\eta^{2-6}$-ligand, such as a $\eta^5$-ligand. Preferably, a metallocene is a Group 4 to 6 transition metal, more preferably zirconium, which contains at least one $\eta^5$-ligand.

Preferably the asymmetric catalyst compound has a formula (II):

$$(Cp)_m R_n MX_q \quad\quad (II)$$

wherein

M is Zr, Hf or Ti, preferably Zr each X is independently a monovalent anionic ligand, such as σ-ligand, each Cp is independently an unsaturated organic cyclic ligand which coordinates to M, R is a bridging group linking two ligands L, m is 2, n is 0 or 1, more preferably 1, q is 1, 2 or 3, more preferably 2, m+q is equal to the valency of the metal, and at least one Cp-ligand, preferably both Cp-ligands, is(are) selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl, with the proviso in case both Cp-ligands are selected from the above stated group that both Cp-ligands must chemically differ from each other.

Preferably, the asymmetric catalyst is of formula (II) indicated above, wherein

M is Zr each X is Cl, n is 1, and q is 2.

Preferably both Cp-ligands have different residues to obtain an asymmetric structure.

Preferably, both Cp-ligands are selected from the group consisting of substituted cyclopentadienyl-ring, substituted indenyl-ring, substituted tetrahydroindenyl-ring, and substituted fluorenyl-ring wherein the Cp-ligands differ in the substituents bonded to the rings.

The optional one or more substituent(s) bonded to cyclopentadienyl, indenyl, tetrahydroindenyl, or fluorenyl may be independently selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR″$_3$, —OSiR″$_3$, —SR″, —PR″$_2$ and —NR″$_2$, wherein each R″ is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both Cp-ligands are indenyl moieties wherein each indenyl moiety bear one or two substituents as defined above. More preferably each Cp-ligand is an indenyl moiety bearing two substituents as defined above, with the proviso that the substituents are chosen in such are manner that both Cp-ligands are of different chemical structure, i.e. both Cp-ligands differ at least in one substituent bonded to the indenyl moiety, in particular differ in the substituent bonded to the five member ring of the indenyl moiety.

Still more preferably both Cp are indenyl moieties wherein the indenyl moieties comprise at least at the five membered ring of the indenyl moiety, more preferably at 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, with proviso that the indenyl moieties of both Cp must chemically differ from each other, i.e. the indenyl moieties of both Cp comprise different substituents.

Still more preferred both Cp are indenyl moieties wherein the indenyl moieties comprise at least at the six membered ring of the indenyl moiety, more preferably at 4-position, a substituent selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents.

Yet more preferably both Cp are indenyl moieties wherein the indenyl moieties comprise at the five membered ring of the indenyl moiety, more preferably at 2-position, a substituent and at the six membered ring of the indenyl moiety, more preferably at 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents. It is in particular preferred that both Cp are idenyl rings comprising two substituents each and differ in the substituents bonded to the five membered ring of the idenyl rings.

Concerning the moiety "R" it is preferred that "R" has the formula (III)

$$—Y(R')_2— \quad\quad (III)$$

wherein

Y is C, Si or Ge, and

R' is $C_1$ to $C_{20}$ alkyl, $C_6$-$C_{12}$ aryl, or $C_7$-$C_{12}$ arylalkyl.

In case both Cp-ligands of the asymmetric catalyst as defined above, in particular case of two indenyl moieties, are linked with a bridge member R, the bridge member R is typically placed at 1-position. The bridge member R may contain one or more bridge atoms selected from e.g. C, Si and/or Ge, preferably from C and/or Si. One preferable bridge R is —Si(R')$_2$—, wherein R' is selected independently from one or more of e.g. C$_1$-C$_{10}$ alkyl, C$_1$-C$_{20}$ alkyl, such as C$_6$-C$_{12}$ aryl, or C$_7$-C$_{40}$, such as C$_7$-C$_{12}$ arylalkyl, wherein alkyl as such or as part of arylalkyl is preferably C$_1$-C$_6$ alkyl, such as ethyl or methyl, preferably methyl, and aryl is preferably phenyl. The bridge —Si(R')$_2$— is preferably e.g. —Si(C$_1$-C$_6$ alkyl)$_2$-, —Si(phenyl)$_2$- or —Si(C$_1$-C$_6$ alkyl)(phenyl)-, such as —Si(Me)$_2$-.

In a preferred embodiment the asymmetric catalyst is defined by the formula (IV)

$$(Cp)_2R_1ZrX_2 \qquad (IV)$$

wherein each X is independently a monovalent anionic ligand, such as σ-ligand, in particular halogen both Cp coordinate to M and are selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl, with the proviso that both Cp-ligands must chemically differ from each other, and R is a bridging group linking two ligands L, wherein R is defined by the formula (III)

$$—Y(R')_2— \qquad (III)$$

wherein

Y is C, Si or Ge, and

R' is C$_1$ to C$_{20}$ alkyl, C$_6$-C$_{12}$ aryl, or C$_7$-C$_{12}$ arylalkyl.

More preferably the asymmetric catalyst is defined by the formula (IV), wherein both Cp are selected from the group consisting of substituted cyclopentadienyl, substituted indenyl, substituted tetrahydroindenyl, and substituted fluorenyl.

Yet more preferably the asymmetric catalyst is defined by the formula (IV), wherein both Cp are selected from the group consisting of substituted cyclopentadienyl, substituted indenyl, substituted tetrahydroindenyl, and substituted fluorenyl with the proviso that both Cp-ligands differ in the substituents, i.e. the subtituents as defined above, bonded to cyclopentadienyl, indenyl, tetrahydroindenyl, or fluorenyl.

Still more preferably the asymmetric catalyst is defined by the formula (IV), wherein both Cp are indenyl and both indenyl differ in one substituent, i.e. in a substituent as defined above bonded to the five member ring of indenyl.

It is in particular preferred that the asymmetric catalyst is a non-silica supported catalyst as defined above, in particular a metallocene catalyst as defined above.

In a preferred embodiment the asymmetric catalyst is dimethylsilyl [(2-methyl-(4'-tert.butyl)-4-phenyl-indenyl)(2-isopropyl-(4'-tert.butyl)-4-phenyl-indenyl)]zirconium dichloride. More preferred said asymmetric catalyst is not silica supported.

The above described asymmetric catalyst components are prepared according to the methods described in WO 01/48034.

In a preferred embodiment the asymmetric catalyst system is obtained by the emulsion solidification technology as described in WO 03/051934. This document is herewith included in its entirety by reference. Hence in this specific embodiment the asymmetric catalyst is preferably in the form of solid catalyst particles, obtainable by a process comprising the steps of a) preparing a solution of one or more asymmetric catalyst components;

b) dispersing said solution in a solvent immiscible therewith to form an emulsion in which said one or more catalyst components are present in the droplets of the dispersed phase, c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably C$_3$-C$_{30}$ perfluoroalkanes, -alkenes or -cycloalkanes, more preferred C$_4$-C$_{10}$ perfluoro-alkanes, -alkenes or -cycloalkanes, particularly preferred perfluorohexane, perfluoroheptane, perfluorooctane or perfluoro (methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated C$_1$ to C$_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 m$^2$/g, still more preferably less than 20 m$^2$/g, yet more preferably less than 15 m$^2$/g, yet still more preferably less than 10 m$^2$/g and most preferably less than 5 m$^2$/g, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

Preferred as cocatalysts for metallocenes and non-metallocenes, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described i.a. in WO 94/28034 which is incorporated herein by reference. These are linear or cyclic oligomers of having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10 000, suitably 5 to 8000, preferably 10 to 7000, e.g. 100 to 4000, such as 1000 to 3000. Typically in case of solid (heterogeneous) catalyst the ratio is preferably below 500.

The quantity of cocatalyst to be employed in the catalyst of the invention is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

Furthermore, the present invention relates to a heterophasic polypropylene composition comprising the inventive heterophasic polypropylene resin and modifiers in an amount of up to 10 wt % as well as additives in an amount up to 1 wt %.

These modifiers and/or additives may be included during the polymerisation process or after the polymerisation by melt mixing. Suitable modifiers include other thermoplastics like polyethylene homo- or copolymers, poly-1-butene, and/or poly-4-methylpentene-1 thermoplastic as well as mineral fillers like talc or calcium carbonate. Suitable additives include stabilizers, lubricants, nucleating agents, pigments and foaming agents.

Further, the present invention relates to articles comprising the heterophasic polypropylene resin or the heterophasic polypropylene composition according to the invention produced by any common conversion process suitable for thermoplastic polymers like injection moulding, extrusion blow moulding, injection stretch blow moulding or cast film extrusion.

Still further, the present invention relates to the use of the heterophasic polypropylene resin according to the invention for producing such an article.

Typical applications requiring the use of high-impact heterophasic polypropylene resins according to the present invention, or compositions based on such resins further comprising fillers, reinforcements and elastomers, are technical components like automotive components or appliance parts, also transport packaging elements like multi-use crates or boxes.

In the following, the present invention is described by way of examples.

EXAMPLES

1. Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR2 of polypropylene is determined at a temperature of 230° C. and a load of 2.16 kg.

b) Xylene Soluble Fraction

The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XCS\% = (100 \times m_1 \times v_0)/(m_0 \times v_1),$$

wherein $m_0$ designates the initial polymer amount (grams), $m_1$ defines the weight of residue (grams), $v_0$ defines the initial volume (milliliter) and $v_1$ defines the volume of the analysed sample (milliliter). The fraction insoluble in p-xylene at 25° C. (XCU) is then equal to 100%−XCS %.

c) Intrinsic Viscosity

The intrinsic viscosity (IV) value increases with the molecular weight of a polymer. The intrinsic viscosity of the XCU and the XCS fraction is measured in decalin at 135° C. according to DIN EN ISO 1628-1 and -3.

d) Molecular Weights

The weight average molecular weight Mw, number average molecular weight, the z-molecular weight and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 ml/min. 216.5 μl of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 ml (at 160° C.) of stabilized TCB (same as mobile phase) and keeping for 3 hours with continuous shaking prior sampling in into the GPC instrument.

In case of PP the constants are: K: 19×10-3 ml/g and a: 0.725 for PP e) Quantification of Microstructure by $^{13}$C-NMR Spectroscopy Quantitative nuclear-magnetic resonance (NMR) spectroscopy was used to quantify the isotacficity, regio-regularity and comonomer content of the polymers.

Quantitative $^{13}$C{$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification.{busico01, busico97} Standard single-pulse excitation was employed utilising the NOE and bi-level WALTZ16 decoupling scheme{zhou07,busico07}. A total of 8192 (8 k) transients were acquired per spectra For ethylene-propylene copolymers approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent {singh09}. To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme{zhou07,busico07}. A total of 6144 (6 k) transients were acquired per spectra.

Quantitative $^{13}C\{^1H\}$ NMR spectra were processed, integrated and relevant quantitative properties determined from the integrals using proprietary computer programs.

For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects {resconi00, cheng84, wang00} or comonomer were observed.

The tacticity distribution was quantified through integration of the methyl region between 23.6-19.7 ppm correcting for any sites not related to the stereo sequences of interest.{busico01, busico97}.

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2.1 erythro regio defects was indicated by the presence of the two methyl sites at 17.7 and 17.2 ppm and confirmed by other characteristic sites.

Characteristic signals corresponding to other types of regio defects were not observed {resconi00}.

The amount of 2.1 erythro regio defects was quantified using the average integral of the two characteristic methyl sites at 17.7 and 17.2 ppm:

$P_{21e}=(I_{e6}+I_{e8})/2$

The amount of 1, 2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio defects:

$P_{total}=P_{12}+P_{21e}$

The mole percent of 2.1 erythro regio defects was quantified with respect to all propene:

[21e] mol %=100*($P_{21e}/P_{total}$)

For copolymers characteristic signals corresponding to the incorporation of ethylene were observed {cheng84}.

With regio defects also observed {resconi00, cheng84, wang00} correction for the influence of such defects on the comonomer content was required.

The mole fraction of ethylene in the polymer was quantified using the method of Wang et. al. {wang00} through integration of multiple signals across the whole spectral region of a $^{13}C\{^1H\}$ spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

$E$[mol %]=100*$fE$

The weight percent comonomer incorporation in the polymer was calculated from the mole fraction according to:

$E$[wt %]=100*($fE$*28.05)/(($fE$*28.05)+
((1-$fE$)*42.08))

The comonomer sequence distribution at the triad level was determined using the method of Kakugo et al. {Kakugo82} through integration of multiple signals across the whole spectral region of a $^{13}C\{^1H\}$ spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. {Kakugo82} according to:

XXX [mol %]=100*fXXX

The mole fraction comonomer incorporation in the polymer, as determined from the comonomer sequence distribution at the triad level, were calculated from the triad distribution using known necessary relationships {Randall89}:

fXEX=fEEE+fPEE+fPEP fXPX=fPPP+fEPP+fEPE where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

R(E)[%]=100*(fPEP/fXEX)

busico01
Busico, V., Cipullo, R., Prog. Polym. Sci. 26 (2001) 443
busico97
Busico, V., Cipullo, R., Monaco, G., Vacatello, M., Segre, A. L., Macromoleucles 30 (1997) 6251 zhou07
Zhou, Z., Kuemmerle, R., Qiu, X., Redwine, D., Cong, R., Taha, A., Baugh, D. Winniford, B., J. Mag. Reson. 187 (2007) 225 busico07
Busico, V., Carbonniere, P., Cipullo, R., Pellecchia, R., Severn, J., Talarico, G., Macromol. Rapid Commun. 2007, 28, 1128 resconi00
Resconi, L., Cavallo, L., Fait, A., Piemontesi, F., Chem. Rev. 2000, 100, 1253 wang00
Wang, W-J., Zhu, S., Macromolecules 33 (2000), 1157 cheng84
Cheng, H. N., Macromolecules 17 (1984), 1950 singh09
Singh, G., Kothari, A., Gupta, V., Polymer Testing 28 5 (2009), 475 kakugo82
Kakugo, M., Naito, Y., Mizunuma, K., Miyatake, T. Macromolecules 15 (1982) 1150 randall89
Randall, J. Macromol. Sci., Rev. Macromol. Chem. Phys. 1989, C29, 201 f) Melting and Crystallisation Temperature

The melting and crystallisation temperature Tm and Tc are determined according to ISO 11357-1, -2 and -3 with a TA-Instruments 2920 Dual-Cell with RSC refrigeration apparatus and data station. A heating and cooling rate of 10° C./min is applied in a heat/cool/heat cycle between +23 and +210° C., the crystallisation temperature Tc being determined in the cooling step and the Tm melting temperature being determined in the second heating step.

g) Charpy Notched Impact Strength

Charpy impact strength was determined according to ISO 179-1eA:2000 on V-notched samples of 80×10×4 mm³ at 23° C. (Charpy impact strength (23° C.)), −20° C. (Charpy impact strength (−20° C.)) and −40° C. (Charpy impact strength (−40° C.)). When not otherwise stated a standard impact velocity of 2.9 m/s was used.

The test specimens were prepared by injection moulding using an IM V 60 TECH machinery in line with ISO 1872-2. The melt temperature was 200° C. and the mold temperature was 40° C.

h) Tensile Modulus

Tensile strength properties were determined according to ISO 527-2. Compression moulded specimens of type 1A were used, which were prepared according to ISO 1872-2.

Tensile modulus (in MPa) was determined according to ISO 527-2. The measurement was conducted at 23° C. temperature with an elongation rate of 1 mm/min.

2. Compositions

Catalyst:
A support-free catalyst (III) has been prepared as described in example 5 of WO 03/051934 whilst using an asymmetric metallocene dimethylsilyl [(2-methyl-(4'-tert.butyl)-4-phenyl-indenyl)(2-isopropyl-(4'-tert.butyl)-4-phenyl-indenyl)] zirconium dichloride.

In the ZN-based comparative examples the catalyst system was a Vinylcyclohexyl (VHC)-modified catalyst prepared according to Example 1 of WO99/24479, in combination with cocatalyst Triethylaluminium (TEA) and as an external donor ED either dicyclopentyl dimethoxy silane (donor D) or diethylamino triethoxy silane (donor U).

Polymerisation:

The SSC-based inventive and comparative examples were prepared in a 2 l bench scale reactor initially filled with $N_2$ at 1 bar gauge. Catalyst, minor amount of triethylaluminum and hydrogen were first added in the reactor. Liquid propylene was fed and a pre-polymerization was carried out at 20° C. for 6 min. Stirring was started and the temperature was increased to a set point temperature of 70° C. Additional data can be found in table 1. At these conditions the polymerization of the matrix component was carried out. In a subsequent step in the same vessel in the presence of the matrix particles with still active catalyst a gas phase polymerization was conducted to form the ethylene-propylene disperse phase. The operating temperature in the gas phase was 80° C., see again table 1. This high temperature and the fact that ethylene is acting as a chain transfer agent led to a drop in the intrinsic viscosity of the produced XCS fraction. The hydrogen feed was stopped and the intrinsic viscosity of the XCS fraction regulated by the $C_2/C_3$-ratio. At the end of the polymerisation, the reactor was vented.

TABLE 1

Preparation of Inventive Examples and SSC-based Comparative Examples:

|  | EX1 | EX2 | EX3 | CE1 | CE2 |
|---|---|---|---|---|---|
| Bulk phase polymerization | | | | | |
| Temperature [° C.] | 70 | 70 | 70 | 70 | 70 |
| Pressure [bar] | 30 | 30 | 30 | 30 | 30 |
| $H_2$ partial pressure [bar] | 0.9 | 1.1 | 1.0 | 0.9 | 0.8 |
| Residence time [h] | 1.0 | 1.0 | 1.0 | 0.9 | 0.8 |
| Gas phase polymerization | | | | | |
| Temperature [° C.] | 80 | 80 | 80 | 80 | 80 |
| Pressure [bar] | 18 | 18 | 18 | 18 | 18 |
| $C_2/C_3$ [mol/mol] | 0.90 | 1.00 | 2.33 | 0.25 | 3.00 |
| Residence time [h] | 1.3 | 1.3 | 1.0 | 2.5 | 0.9 |

The commercial ethylene-propylene impact copolymer EF015AE (available from Borealis Polyolefine GmbH, Austria) having an MFR of 18 g/10 min, an XCS content of 29.0 wt % and a total $C_2$ content of 20.0 wt % was used as comparative example 2. Other comparative examples were prepared using Borstar® technology in a plant having a loop reactor and three fluid bed gas-reactors connected in series. The respective process details can be found in table 2.

TABLE 2

Preparation of Ziegler-Natta-based Comparative Examples:

|  | CE4 | CE5 | CE6 |
|---|---|---|---|
| Donor | D | U | D |
| Al/Ti ratio [mol/mol] | 490 | 522 | 425 |
| Al/donor ratio [mol/mol] | 39.6 | 25.4 | 20.0 |
| Loop | | | |
| T [° C.] | 85 | 75 | 85 |
| Pressure [bar] | 54 | 56 | 55 |
| $H_2/C_3$ [mol/kmol] | 15.2 | 17.4 | 11.1 |
| $C_3$ feed [kg/h] | 199.6 | 200.1 | 196 |
| Residence time [h] | 0.45 | 0.44 | 0.56 |
| 1st GPR | | | |
| T [° C.] | 85 | 85 | 85 |
| Pressure [bar] | 19 | 21 | 26 |
| $H_2/C_3$ [mol/kmol] | 169 | 130 | 75 |
| $C_3$ feed [kg/h] | 43.0 | 44.1 | 51.2 |

TABLE 2-continued

Preparation of Ziegler-Natta-based Comparative Examples:

|  | CE4 | CE5 | CE6 |
|---|---|---|---|
| Residence time [h] | 2.0 | 1.9 | 1.6 |
| $C_2$-content [wt %] | 0.0 | 0.0 | 0.0 |
| MFR [g/10 min] | 175 | 280 | 34 |
| Split Loop/$1^{st}$ GPR | 49/51 | 49/51 | 47/53 |
| $2^{nd}$ GPR | | | |
| T [° C.] | 80 | 80 | 80 |
| Pressure [bar] | 29 | 29 | 27 |
| $H_2/C_3$ [mol/kmol] | 127 | 75 | 125 |
| $C_2/C_3$ [mol/kmol] | 802 | 514 | 457 |
| $C_3$ feed [kg/h] | 60 | 80 | 50 |
| Residence time [h] | 1.47 | 1.37 | 1.34 |
| $C_2$-content [wt %] | 13.7 | 10.4 | 7.2 |
| $3^{rd}$ GPR | | | |
| T [° C.] | 65 | 80 | 80 |
| Pressure [bar] | 14 | 26 | 29 |
| $H_2/C_2$ [mol/kmol] | 120 | 141 | 231 |
| $C_2/C_3$ [mol/kmol] | 3572 | 508 | 438 |
| $C_2$ feed [kg/h] | 14.5 | 24 | 60 |
| Residence time [h] | 0.90 | 0.92 | 0.87 |
| $C_2$ [wt %] | 14.3 | 17.2 | 11.1 |
| Split $2^{nd}$ GPR/$3^{rd}$ GPR | 51/49 | 52/48 | 53/47 |

Figure 1:
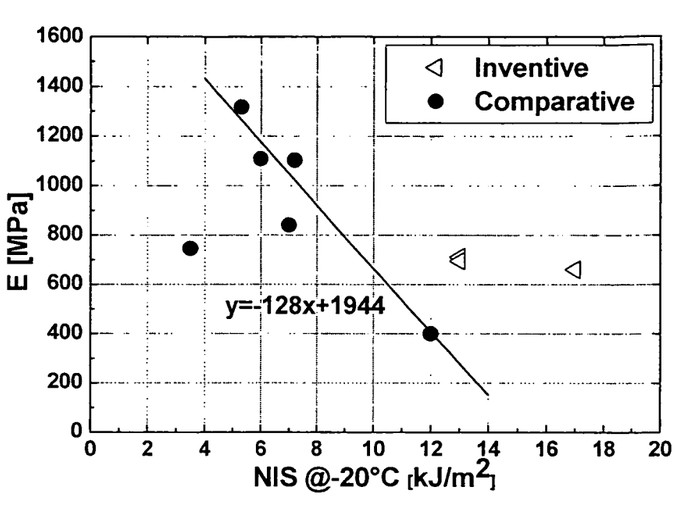

After the polymerisation process the materials were pelletized in the presence of standard antioxidants and process stabilizers. The pelletization was done on a twin screw extruder (type PRISM TSE24E, screw diameter 24 mm, L/d ratio 48) with the following temperature profile: Zone 1; Zone 2; Zone 3; Zone 4; Zone 5; of 210° C.; 215° C.; 220° C.; 215° C.; 210° C. accordingly. The screw speed was set to 250 rpm and the throughput to 3 kg/h. The polymer was dried in an oven, assisted by a flow of warm nitrogen, and samples were analyzed. The results are summarized in Tables 3 and 4. FIG. 1 shows the clear mechanical advantage of the inventive examples, visible as an improved relation between impact strength and modulus.

TABLE 3

Characterization of inventive examples

|  | EX1 | EX2 | EX3 |
|---|---|---|---|
| $MFR_2$-Matrix [g/10 min] | 210 | 300 | 350 |
| $MFR_2$-total [g/10 min] | 39 | 88 | 32 |
| XS [wt %] | 30.6 | 29.7 | 30.6 |
| $C_2$-total [wt %] | 14.2 | 12.7 | 21.2 |
| IV (XU) [dl/g] | 1.04 | 0.91 | 0.91 |
| Mw (XU) [kg/mol] | 103 | 90 | 88 |
| MWD (XU) [—] | 2.6 | 2.7 | 2.8 |
| $C_2$ (XS) [wt %] | 46.4 | 42.8 | 69.2 |
| IV (XS) [dl/g] | 2.10 | 2.12 | 2.51 |
| Mw (XS) [kg/mol] | 203 | 201 | 305 |
| MWD (XS) [—] | 3.0 | 3.0 | 3.3 |
| IV(XS)/IV(XU) [—] | 2.02 | 2.33 | 2.76 |
| Tm (PP) = Tm (XU) [° C.] | 154 | 154 | 154 |
| Tc [° C.] | 117 | 117 | 118 |
| Tm (PE) | — | — | — |
| Tensile modulus [MPa] | 660 | 710 | 695 |
| Charpy NIS 1eA +23° C. [kJ/m²] | 54.0 | 47.0 | 38.8 |
| Charpy NIS 1eA −20° C. [kJ/m²] | 17.0 | 13.0 | 13.0 |
| Charpy NIS 1eA −40° C. [kJ/m²] | 15.0 | 11.0 | 11.3 |

TABLE 4

Characterization of comparative examples

|  | CE1 | CE2 | CE3 | CE4 | CE5 | CE6 |
|---|---|---|---|---|---|---|
| $MFR_2$-Matrix [g/10 min] | 250 | 180 | 85 | 175 | 280 | 34 |
| $MFR_2$-total [g/10 min] | 65 | 53 | 18 | 43 | 40 | 13 |
| XS [wt %] | 36.9 | 22.8 | 29.0 | 28.6 | 32.5 | 28.9 |
| $C_2$-total [wt %] | 6.5 | 16.8 | 20.0 | 12.0 | 17.8 | 11.5 |
| IV (XU) [dl/g] | 1.0 | 1.2 | 1.7 | 1.2 | 0.9 | 2.0 |
| Mw (XU) [kg/mol] | 96 | 121 | 297 | 202 | 130 | n.d. |
| MWD (XU) [—] | 2.7 | 4.9 | 4.9 | 4.4 | 4.0 | n.d. |
| $C_2$ (XS) [wt %] | 17.1 | 73.7 | 65.5 | 42.5 | 46.0 | 34.5 |
| IV (XS) [dl/g] | 1.8 | 2.6 | 3.0 | 2.2 | 2.3 | 1.8 |
| Mw (XS) [kg/mol] | 190 | 371 | 443 | 265 | 280 | n.d. |
| MWD (XS) [—] | 3.1 | 4.6 | 6.2 | 4.5 | 4.2 | n.d. |
| IV(XS)/IV(XU) [—] | 1.8 | 2.2 | 1.8 | 1.8 | 2.6 | 0.9 |
| Tm = Tm (XU) [° C.] | 153 | 154 | 165 | 166 | 165 | 165 |
| Tc [° C.] | 117 | 118 | 112 | 127 | 127 | 126 |
| Tensile modulus [MPa] | 400 | 745 | 840 | 1317 | 1108 | 1102 |
| Charpy NIS 1eA +23° C. [kJ/m²] | 64.3 | 3.6 | 33.0 | 7.8 | 9.2 | 26.8 |
| Charpy NIS 1eA −20° C. [kJ/m²] | 12.0 | 3.5 | 7.0 | 5.3 | 6.0 | 7.2 |
| Charpy NIS 1eA −40° C. [kJ/m²] | 10.8 | 2.9 | 4.5 | 4.8 | 5.4 | n.d. | n.d.—not determined

The invention claimed is:

1. A heterophasic polypropylene resin having an $MFR_2$ according to ISO 1133 at 230° C./2.16 kg of 25 to 95 g/10 min comprising a crystalline polypropylene homopolymer matrix (A) and an amorphous propylene/alpha olefin copolymer phase (B) dispersed within the matrix, wherein the heterophasic polypropylene resin has 35 to 75 wt % of a fraction insoluble in p-xylene at 25° C. (XCU) with
an intrinsic viscosity of less than 1.1 dl/g, determined according to DIN EN ISO 1628-1 and -3, and
a melting point of more than 150° C., and 25 to 65 wt % of a fraction soluble in p-xylene at 25° C. (XCS) with
an intrinsic viscosity of 2.0 to 5.0 dl/g, determined according to DIN EN ISO 1628-1 and -3,
a content of ethylene monomer units in the range of 43 to 60 wt %, based on the total weight of the XCS fraction,
the absence of a melting point, in a DSC analysis in the range between 0 and 300° C., and
a molecular weight distribution (MWD) of 1.0 to 4.0 measured by GPC according to ISO 16014-1 and 4, and the heterophasic polypropylene resin has a Charpy notched impact strength at −20° C. of at least 15 kJ/m², determined according to ISO 179-1/1eA.

2. The heterophasic polypropylene resin according to claim 1, wherein the XCU fraction has a melt flow rate of at least 200 g/10 min determined according to ISO 1133 at 230° C./2.16 kg.

3. The heterophasic polypropylene resin according to claim 1, wherein the XCS fraction has a weight average molecular weight $M_w$ of 250 to 900 kg/mol measured by GPC according to ISO 16014-1 and 4.

4. The heterophasic polypropylene resin according to claim 1, wherein the resin has a Charpy notched impact strength at +23° C. of at least 30 kJ/m², determined according to ISO 179-1/1eA.

5. The heterophasic polypropylene resin according to claim 1, wherein the resin has a Charpy notched impact strength at −40° C. of at least 11 kJ/m², determined according to ISO 179-1/1eA.

6. The heterophasic polypropylene resin according to claim 1, wherein the resin has been produced in a multi-stage process.

7. The heterophasic polypropylene resin according to claim 1, wherein the polypropylene resin has a tensile modulus of at least 600 MPa, when determined according to ISO 527-2 on compression moulded specimens of type 1A produced according to ISO 1872-2.

8. The heterophasic polypropylene resin according to claim 1 wherein the resin has been produced in presence of a catalyst system comprising an asymmetric catalyst.

9. The heterophasic polypropylene resin according to claim 8, wherein the asymmetric catalyst is dimethylsilyl [(2-methyl-(4'-tert.butyl)-4-phenyl-indenyl)(2-isopropyl-(4'-tert.butyl)-4-phenyl-indenyl)]-zirconium dichloride.

10. A heterophasic composition comprising a heterophasic polypropylene resin according to claim 1 and additives in an amount of up to 10 wt %.

11. A process for producing a heterophasic polypropylene resin according to claim 1 wherein the process comprises
 (i) at least one liquid bulk polypropylene homo-polymerization step carried out at a temperature of 80 to 90° C., and
 (ii) at least one gas phase propylene/ethylene copolymerization step carried out at a temperature of 55 to 90° C., and
 wherein the liquid bulk polypropylene homo-polymerization step (i) is carried out prior to the gas phase copolymerization step (ii), the used catalyst system comprises an asymmetric single-site catalyst, and the molar ratio between ethylene and propylene feed in the copolymerization step (ii) is of 0.6 to 2.6.

12. A heterophasic polypropylene resin having an MFR₂ according to ISO 1133 at 230° C./2.16 kg of 25 to 95 g/10 min comprising a crystalline polypropylene homopolymer matrix (A) and an amorphous propylene/alpha olefin copolymer phase (B) dispersed within the matrix, wherein the heterophasic polypropylene resin has
 35 to 75 wt % of a fraction insoluble in p-xylene at 25° C. (XCU) with
  an intrinsic viscosity of less than 1.1 dl/g, determined according to DIN EN ISO 1628-1 and -3, and
  a melting point of more than 150° C., and
 25 to 65 wt % of a fraction soluble in p-xylene at 25° C. (XCS) with
  an intrinsic viscosity of 2.0 to 5.0 dl/g, determined according to DIN EN ISO 1628-1 and -3,
  a content of ethylene monomer units in the range of 43 to 60 wt %, based on the total weight of the XCS fraction,
  the absence of a melting point, in a DSC analysis in the range between 0 and 300° C., and
  a molecular weight distribution (MWD) of 1.0 to 4.0 measured by GPC according to ISO 16014-1 and 4,
 and the heterophasic polypropylene resin has a Charpy notched impact strength at −20° C. of at least 15 kJ/m², determined according to ISO 179-1/1eA;
 wherein the XCU fraction consists of a crystalline propylene homopolymer and has a crystallinity of at least 50%; and
 wherein the XCS fraction consists of a propylene/ethylene or propylene/alpha olefin copolymer and has a crystallinity of less than 5%.

13. The heterophasic polypropylene resin according to claim 12, wherein the XCU fraction has a weight average molecular weight of 60 to 120 kg/mol and a molecular weight distribution of 2.6 to 3.0.

14. The heterophasic polypropylene resin according to claim 12, wherein the MWD of the XCS fraction is 2.0 to 3.0 and the XCS fraction has a weight average molecular weight of 300 to 750 kg/mol.

* * * * *